Nov. 15, 1927.
J. C. SNAVELY
1,649,622
FURROW TAPPER
Filed Dec. 14, 1926
3 Sheets-Sheet 3
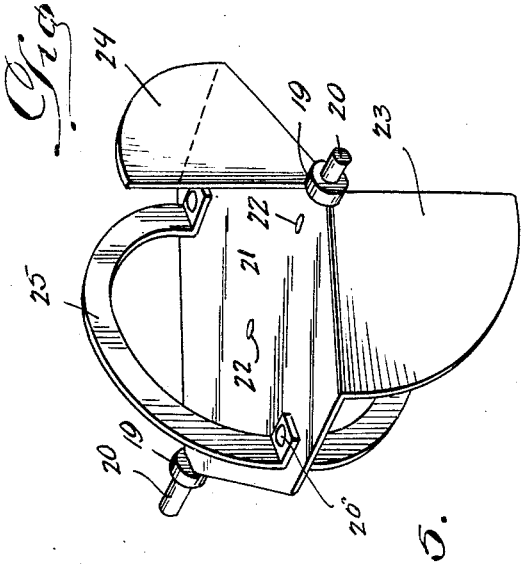
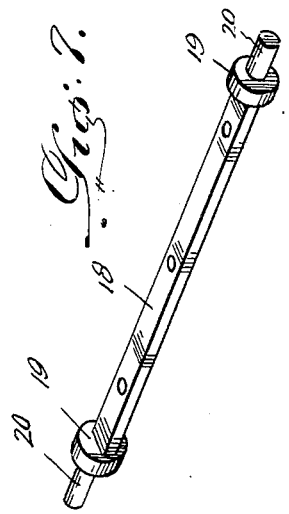
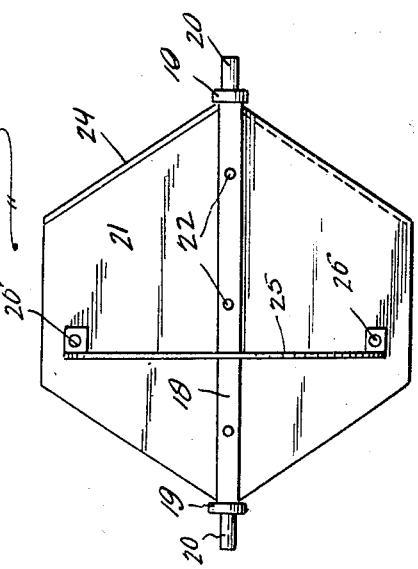
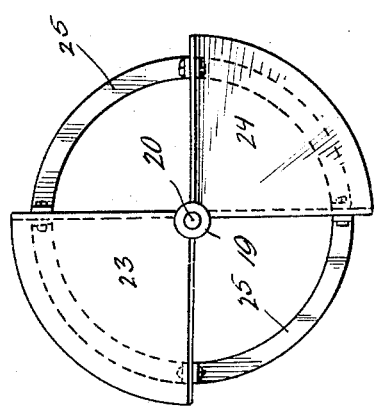
Inventor
John C. Snavely,
By Clarence A. O'Brien
Attorney Patented Nov. 15, 1927.

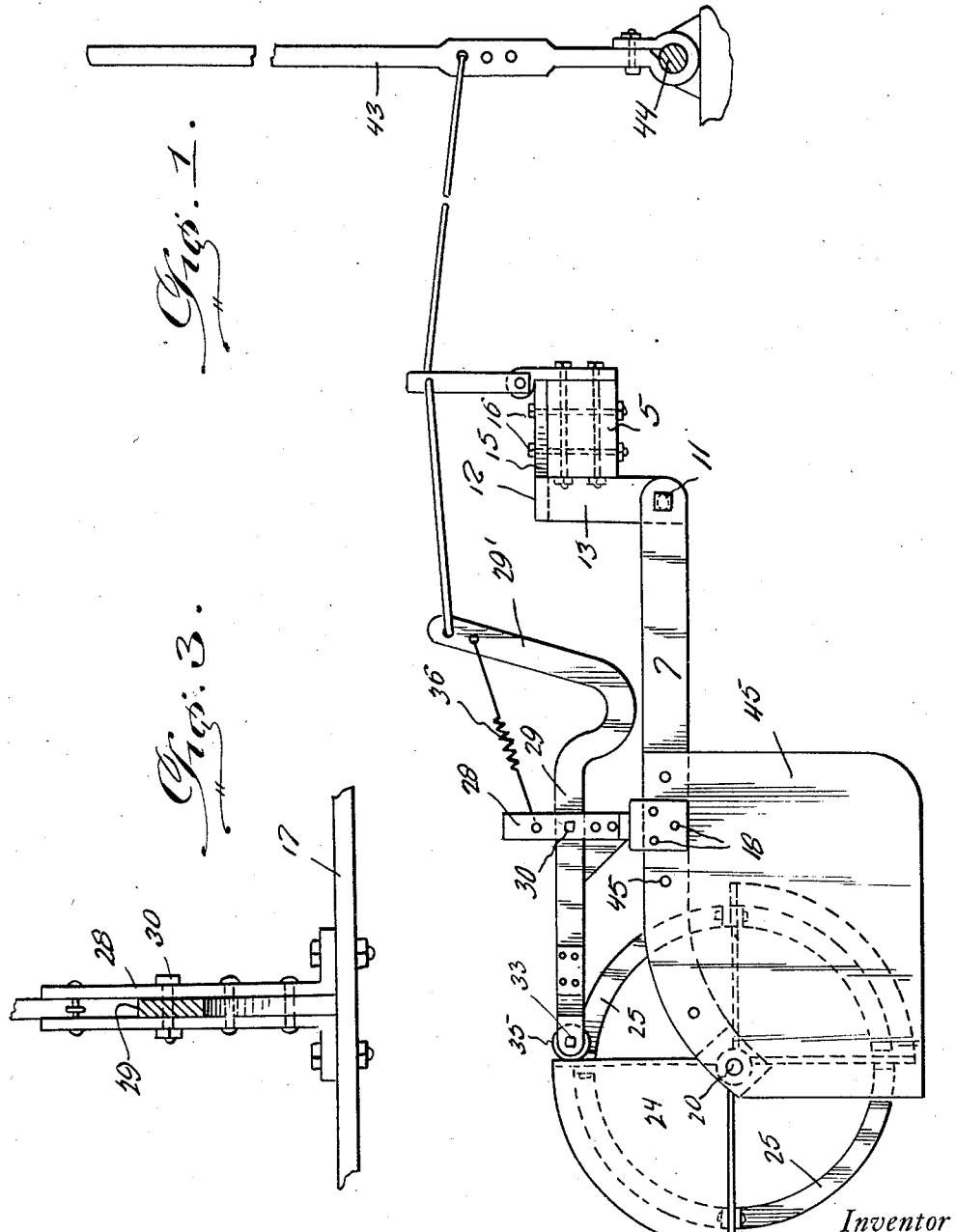

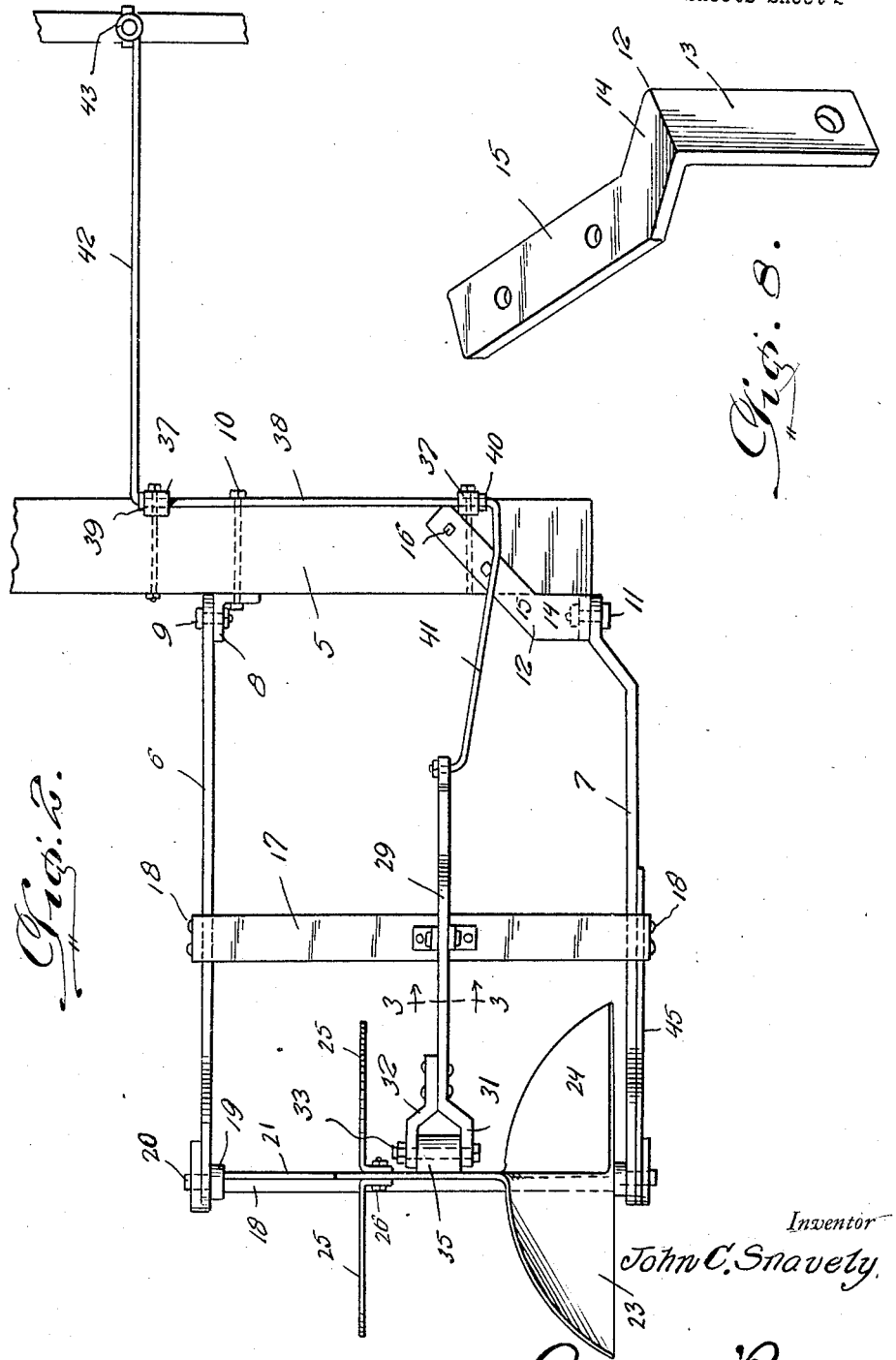

1,649,622

UNITED STATES PATENT OFFICE.

JOHN C. SNAVELY, OF COVINA, CALIFORNIA.

FURROW TAPPER.

Application filed December 14, 1926. Serial No. 154,731.

The present invention relates to improvements in agricultural implements particularly of that nature used for preparing ground for irrigation purposes so as to direct the flow of water where desired.

The important object of the invention is to provide an apparatus of this nature in the form of an attachment used with a plow beam so as to follow the furrowing plow or plows, the attachment being controlled by means of connecting mechanism by the driver from his seat, said implement tapping or filling furrows so as to change the direction of the flow of the water at the convenience of the operator.

This device avoids the necessity of shoveling and hand labor. As is well known in the art straight furrows are made by the furrowing plows and these are checked crosswise by an ordinary furrowing plow attached to the usual plow beam propelled by either tractor or horse power, if desired.

The tapping attachment embodying the features of this invention make this task much easier than by following the ordinary practice.

Another very important object of the invention is to provide a tapping attachment of this nature which is exceedingly simple in its construction, comparatively inexpensive to manufacture, strong and durable, easy to manipulate, compact and convenient, thoroughly reliable and efficient in operation, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a side elevation of an attachment embodying the features of my invention, Figure 2 is a top plan view thereof, Figure 3 is an enlarged detail sectional view taken substantially on the line 3—3 of Figure 2, Figure 4 is a side elevation of the tapping implement, Figure 5 is a top plan view thereof, Figure 6 is a perspective view thereof, Figure 7 is a perspective view of the shaft thereof, and Figure 8 is an enlarged detail perspective view of a bracket used in the construction of the device.

Referring to the drawing in detail it will be seen that 5 denotes a plow beam or any other frame part of a furrowing implement. The numerals 6 and 7 denote side members of the attachment. The side member 6 is attached to the beam 5 by means of an L-bracket 8 being bolted thereto as at 9, while the L-bracket is bolted to the beam as at 10. The side member 7 is bolted as at 11 to a right angled bracket 12 including the right angularly extending legs 13 and 14 the latter of which merges into an oblique extension 15 which is bolted to the plow beam 5 as at 16. The rear ends of these side members 6 and 7 are curved downwardly as is clearly illustrated in Figure 1. A cross bar 17 extends between the members 6 and 7 intermediate their ends to be disposed perpendicularly thereto and has downwardly projected end terminals which are bolted or otherwise secured to the members 6 and 7 as at 18. A shaft 18 has the major portion of its length constructed to be substantially rectangular in cross section, and the ends merge into disks or annular shoulders 19 which in turn merge into coaxially extending rounded shaft portions 20. These rounded end shaft portions 20 are journaled in the rear extremities of the side members 6 and 7. A plate 21 is fixed to the shaft 18 as at 22 and one side edge thereof tapers to a substantial point to terminate adjacent one shoulder 19, while the other side edge of the plate has two laterally extending wings 23 and 24 extending in oppoiste directions from the plate and substantially perpendicularly thereto. These wings are curved transversely. In plan view the plate 21 is hexagonal in formation, the wings 23 and 24 extending from two adjacent edges thereof. Semi-circular bands 25 have laterally extending extremities which are fixed to the plate 21 as at 26. One of these bands is on one face of the plate, and the other band on the other face thereof to form a complete circle.

A pair of L-shaped brackets 28 are attached to the intermediate portion of the cross bar 17 and rise upwardly therefrom in spaced parallel relation. A lever 29 is pivoted intermediate its ends as at 30 between the brackets 28. The rear end of this lever 29 is offset laterally as at 31 and a corresponding removable piece 32 is riveted or otherwise secured to the lever to be complementary to the offset extremity 31 so as to receive a bolt 33 on which is journaled a roller 35. The forward end of the lever is bent downwardly and then upwardly to provide the extension 29'. A spring 36 is engaged between the extension 29' and the brackets 28, and normally holds the lever so that the roller 35 abuts the plate 21 when in a vertical position. A pair of bearing brackets 37 are mounted on the plow beam 5 and have journaled therein a shaft 38 on the ends of which are cranks 39 and 40. A link 41 connects the crank 40 with the upper extremity of the extension 29' of the lever 29. A link 42 is engaged with the crank 39 and with an intermediate portion of a lever 43 which is conveniently pivoted as at 44 in a position to be actuated by the operator of the furrowing plow or like device to which the attachment is mounted.

It is apparent from the above detail description that by rocking the lever 43 forwardly in Figure 1, the lever 29 may be rocked through the intermediacy of the link 42, crank 39, shaft 38, cranks 40 and link 41 so as to lift the roller 35 clear of the plate of the tapping implement so that it will revolve and if the lever 43 is released, the spring 36 will return the parts to the position shown in Figure 1 so as to engage the plate on the opposite side thereof. One side or edge of the hexagonal plate drags in the furrow collecting and propelling in front of it the soil, and when it is tripped as explained above it turns one-half revolution, dropping the soil so collected so as to fill the furrow, this result leaving the opposite side or edge of the plate in the furrow in front of the mass of soil dropped to repeat the process. The wings collect the soil from the sides of the furrow holding it in front of the plates until the same is tripped. The semi-circular bands serve as the rim of a wheel, causing the plate to rotate when tripped by the operator. The numeral 45 denotes a shield which is attached to the rear portion of the side member 7 and depends downwardly therefrom for preventing the soil from piling up on the outside of the wings 24. This shield is attached by bolts 46 or in any other suitable manner, and may be used as explained or may be removed if desired.

It is thought that the construction, operation, utility, and advantages of this invention will now be clearly understood by those skilled in this art without a more detailed description thereof. The present embodiment of the invention has been disclosed in detail merely by way of example since in actual practice it attains the features of advantage enumerated as desirable in the statement of the invention and the above description. It is apparent that changes in the details of construction and in the combination and arrangement of parts may be resorted to without departing from the spirit or scope of the invention as hereinafter claimed or sacrificing any of its advantages.

Having thus described the invention, what I claim as new is:—

1. An attachment of the class described including a frame, a plate, a shaft extending across the plate and journaled in the frame, a trip lever rockably mounted on the frame for holding the plate in a vertical position transversely of the frame, means for rocking the lever to allow rotation of the plate, a pair of semi-circular bands fixed to the plate one on each side thereof in concentric relation to the shaft, said plate being hexagonal in formation and having wings extending from adjacent edges in opposite directions, one wing on each side of said shaft.

2. An attachment of the class described including a frame, a plate, a shaft extending across the plate and journaled in the frame, said plate being hexagonal in formation and having wings projecting from adjacent edges thereof in opposite directions one on each side of said shaft.

3. An attachment of the class described including a frame, plate, a shaft extending across the plate and journaled in the frame, said plate being hexagonal in formation and having wings projecting from adjacent edges thereof in opposite directions one on each side of said shaft, a pair of semi-circular rims attached to the plate, one on each side thereof concentrically about the shaft.

4. An irrigation furrow former comprising a hexagonal plate, a shaft fixed across the plate to bi-sect two opposite corners thereof, quadrant shaped wings extending from two adjacent sides of the plate, one to each side of the shaft, said wings extending in opposite directions.

5. An irrigation furrow former comprising a hexagonal plate, a shaft fixed across the plate to bi-sect two opposite corners thereof, quadrant shaped wings extending from two adjacent sides of the plate, one to each side of the shaft, said wings extending in opposite directions, and a pair of semi-circular rims attached to the plate, one on each side thereof concentrically about the shaft.

In testimony whereof I affix my signature.

JOHN C. SNAVELY.